May 23, 1933.  H. M. HESSENBRUCH  1,911,117
ADJUSTMENT FOR THE STATIONARY KNIVES OF LAWN MOWERS
Filed July 18, 1931
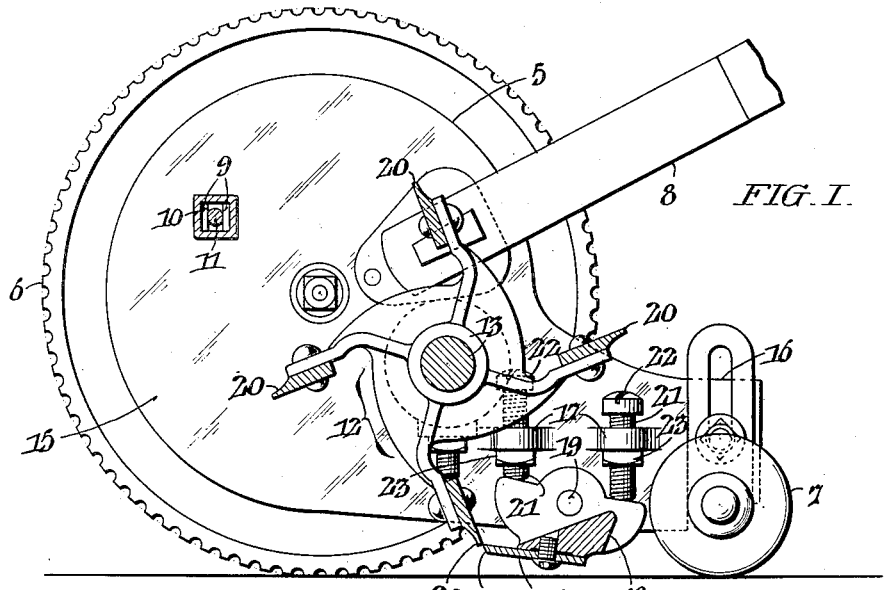
FIG. I.
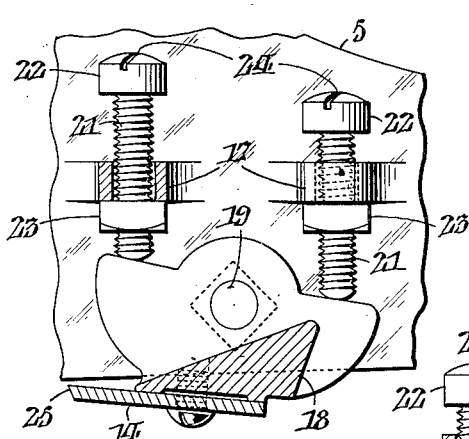
FIG. II.
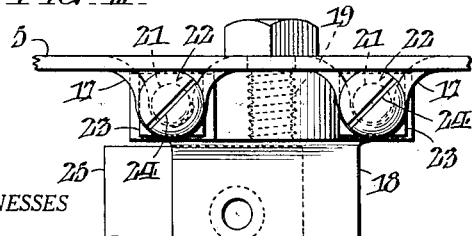
FIG. III.
INVENTOR:
Hermann M Hessenbruch
BY Fraley Paul
ATTORNEYS.

Patented May 23, 1933

1,911,117

UNITED STATES PATENT OFFICE

HERMANN M. HESSENBRUCH, OF WYNNEWOOD, PENNSYLVANIA, ASSIGNOR TO PHILADELPHIA LAWN MOWER COMPANY INC., OF PHILADELPHIA, PENNSYLVANIA, A CORPORATION OF PENNSYLVANIA

ADJUSTMENT FOR THE STATIONARY KNIVES OF LAWN MOWERS

Application filed July 18, 1931. Serial No. 551,617.

This invention relates to adjustments for the stationary knives of lawn mowers and more particularly to means of the type set forth in my prior application, Serial Number 336,843, filed February 1, 1929; and which later matured as Patent No. 1,832,390, dated November 17, 1931.

In the patent referred to the side plates of the lawn mower are provided with apertured abutments for "free" guidance of the stationary knife adjuster screws, said screws being headless and maintained in proper alignment through the medium of associated superjacently-located lateral projections expanded from the side plates.

The primary object of the present improvements is to eliminate the lateral projections above referred to, and to this end I form the adjuster-screws with "cheese" or round-section heads which, in conjunction with the customary nuts, serve to maintain the screw shanks in parallelism with the associated side plates.

In the drawing:

Fig. I is a transverse sectional-view through a lawn mower embodying my novel stationary knife adjuster means.

Fig. II is a relatively enlarged fragmentary detail elevation of the adjuster means forming the present invention, as viewed at one inner side of the lawn mower.

Fig. III is a top plan view of the preceding illustration; and,

Fig. IV is a sectional view taken as indicated by the arrows IV—IV in Fig. III.

In the illustrated constructive disclosure the numeral 5 designates one of the usual side plates of a lawn mower; 6 a ground-wheel; 7 the customary back roller; 8 a broken portion of one of the handle-fork components; 9 paralleling lugs outstanding from the side plate 5; 10 a rectangular-section tubular girth or brace bar; and 11 the tie rod whereby the opposing side plates are secured together in correct alignment. The rotary cutting-reel is comprehensively designated as 12, and 13 is the shaft thereof; while the stationary knife will, hereinafter, be generally referred to as 14.

The parts thus far noted are shown and briefly referred to for reasons later on more apparent and, with the exception of the side plate 5, do not enter into the instant invention, other than as subsidiary combination elements.

In accordance with the present improvements, as best appreciated from Figs. II—IV, inclusive, each side plate 5 is conveniently made of sheet-metal to embody a circular portion 15 with a co-planar substantially rectangular extension 16, as well as with the paralleling lugs 9 aforesaid. Each side plate 5 is also formed with a pair of laterally-directed abutment loops 17 conveniently expanded-out therefrom.

The stationary knife 14 is removably secured to a "back" 18, which is pivoted between the opposing side plates 5 by means of studs 19, one only being visible, in accordance with known practice.

Adjustment of the stationary knife 14 in an upward or downward angular-direction, relative to the blades 20 of the rotary cutting-reel 12, is effected by means of vertically-disposed longitudinally-movable adjuster-screws 21, having "cheese" or round-section heads 22, which are afforded free guidance in the abutment loops 17. These loops 17, it is to be noted, are of a transverse dimension to semi-disengagingly embrace the adjuster-screws 21, while said screws are fitted with threadedly-engaging nuts 23. The nuts 23 are of regular standard formation and size to present a flat face in coactive proximity to the adjoining side plate 5 so as to effectively prevent rotation thereof. Each screw head 22 is of a diameter equalling the dimension across paralleling flat faces of the associated nut 23 so as to correspondingly adjoin the side plate 5, as clearly understandable from Fig. IV, whereby the screws 21 may be rotated, for purposes of adjusting the stationary knife 14; while said screws are maintained in parallelism by means of their respective heads 22 and nuts 23 substantially engaging with the associated side plates 5, in an obvious manner: or, in other words, the screw heads 22 rotatively engage the side plates 5, whereas the nuts 23 are non-rotative relative thereto.

Now, it will be readily apparent, when one of the screws 21 is driven down, as by a screw-driver applied to the cross-cut 24, the nut 23 thereon will be "jammed" against the underface of the associated abutment loop 17 in a manner that effectively locks the stationary knife blade 25 at the desired adjustment relative to the blades 20 of the rotary-cutting reel 12, when the other screw is oppositely driven. Thus, when both screws 21 are driven "home" tightly, the stationary knife 14 is rigidly held "set" while the nuts 23 lock said screws, and the heads 22 serve in conjunction with nuts 23 to maintain the screws from wobbling during adjustment of the knife 14.

From the foregoing, the merits and advantages of this invention will be clearly appreciated, while it is obviously simple and efficient for the purposes hereinbefore set forth.

Having thus described my invention, I claim:

1. In a lawn mover having a stationary knife, the combination of a sheet metal side plate providing pivotal support therefor, said side plate embodying laterally-expanded abutment straps, adjuster screws embodying round-section heads with the shanks thereof afforded free longitudinal guidance in the respective abutment straps while said heads rotatively engage the side plate, a nut of regular flat-side formation on each screw restrained against rotation by one flat face thereof engaging the side plate, and said screw-heads and nuts being of corresponding diameter and cross dimension respectively whereby they jointly serve to maintain the shanks of the associated screws in constant parallelism to the side plate.

2. In a lawn mower having a stationary knife, the combination of a sheet metal side plate providing pivotal support therefor, said side plate embodying vertically-directed laterally-expanded abutment straps, fillister-headed machine-screws with the shanks thereof afforded free longitudinal guidance by the respective abutment straps and said heads rotatively-engaging the plate, standard square nuts on the screws restrained against rotation by one side face engaging with the side plates, and said fillister-heads and nuts being of equal diameter and cross dimension respectively whereby they jointly serve to maintain the screw shanks in constant parallelism to the side plate.

In testimony whereof, I have hereunto signed my name at Philadelphia, Pennsylvania, this 14th day of July, 1931.

HERMANN M. HESSENBRUCH.